United States Patent [19]

Hines

[11] 4,290,684
[45] Sep. 22, 1981

[54] IMAGE STABILIZING APPARATUS
[75] Inventor: Stephen P. Hines, Rochester, N.Y.
[73] Assignee: Eastman Kodak Company, Rochester, N.Y.
[21] Appl. No.: 114,931
[22] Filed: Jan. 24, 1980
[51] Int. Cl.³ .................. G03B 17/00; G02B 23/00
[52] U.S. Cl. .................................. 354/286; 354/70; 354/74; 350/16
[58] Field of Search ................ 354/70, 74, 160, 286; 350/16

[56] References Cited
U.S. PATENT DOCUMENTS

| | | | |
|---|---|---|---|
| 1,824,085 | 9/1931 | Karnes et al. | 354/70 |
| 3,503,663 | 3/1970 | De La Cierva et al. | 354/70 |
| 3,531,176 | 9/1970 | Humphrey | 354/70 |
| 3,728,948 | 4/1973 | Fraser | 350/16 |
| 3,845,929 | 11/1974 | Reekie et al. | 350/16 |
| 3,892,467 | 7/1975 | Shin | 350/16 |
| 3,953,106 | 4/1976 | Furukawa et al. | 350/16 |
| 4,017,168 | 4/1977 | Brown | 354/74 |
| 4,158,488 | 6/1979 | Gottschalk et al. | 354/70 |
| 4,158,489 | 6/1979 | Gottschalk et al. | 354/70 |
| 4,208,028 | 6/1980 | Brown et al. | 354/70 |

FOREIGN PATENT DOCUMENTS 840955  5/1939  France .................. 354/70

Primary Examiner—Russell E. Adams
Attorney, Agent, or Firm—Thomas H. Close

[57] ABSTRACT

Apparatus for maintaining in focus an image formed at the image plane of an optical instrument, notwithstanding random angular movement of the instrument's housing. Such apparatus includes mounting means for angularly decoupling the image-forming element (e.g., a refractive lens) of the optical instrument from the instrument's housing, thereby allowing the image-forming element to move relative to such housing, and means for maintaining the focal plane of the image-forming element substantially parallel to the image plane of the optical instrument during relative angular movement between the image-forming element and the instrument's housing.

11 Claims, 11 Drawing Figures

ANGLE Θ OF TIPPED IMAGE PLANE

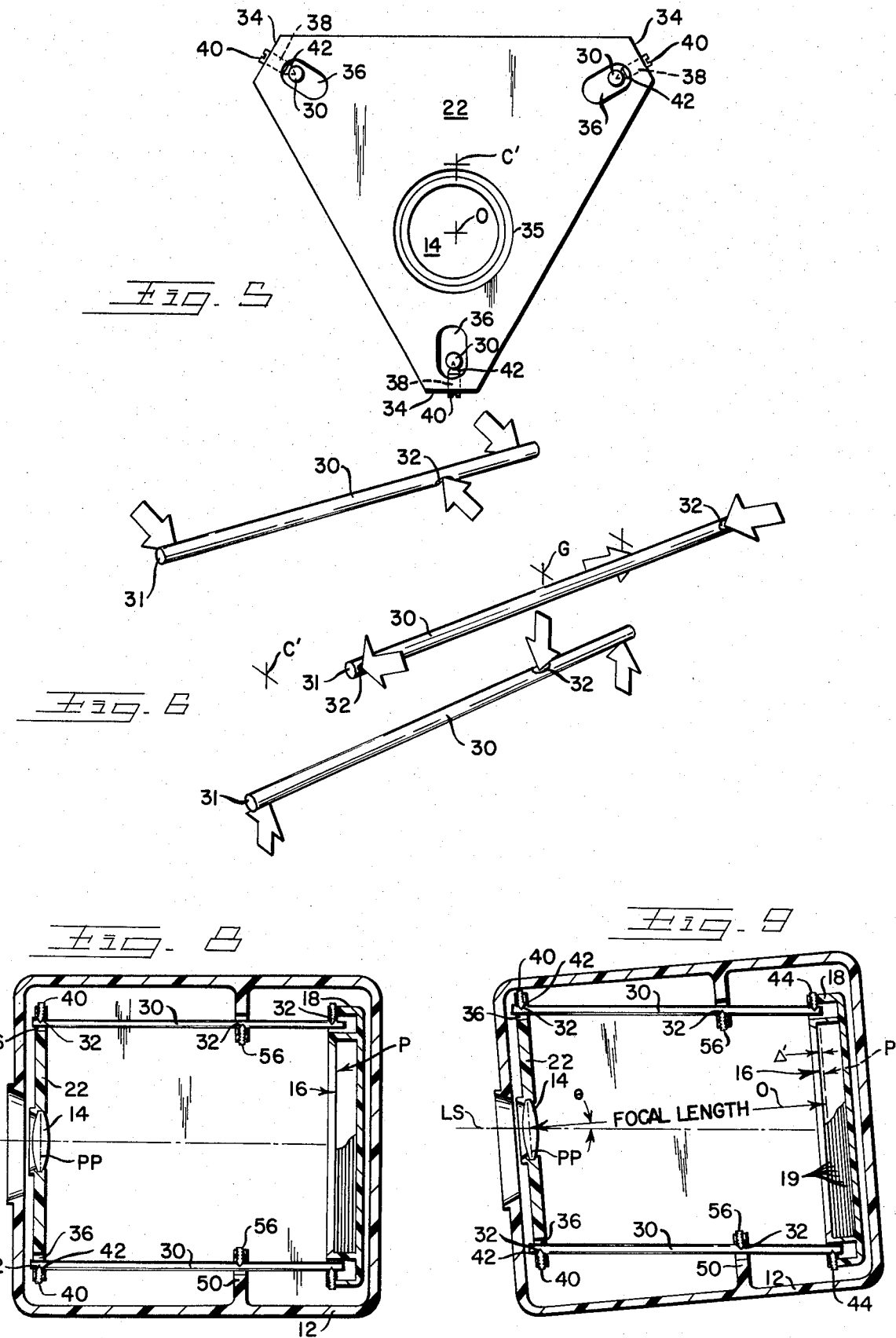

IMAGE STABILIZING APPARATUS

BACKGROUND OF THE INVENTION

The present invention relates to improvements in image-stabilizing apparatus of the type used in optical instruments, such as still and cine cameras, for minimizing image smear, as might result, for example, from an unsteady hand of the instrument user.

Numerous devices have been proposed heretofore for stabilizing an image formed at the image plane of an optical instrument. Such devices typically comprise some type of mounting mechanism for angularly decoupling the image-forming lens from the instrument housing. Upon being angularly decoupled from the housing, the lens and the image formed thereby can remain relatively stable while the housing undergoes certain random and relatively high frequency angular changes in pitch and yaw. It is this type of angular movement of the instrument housing (cf. with lateral movement, in the image plane, or a roll or translational movement of the housing about or along the optical axis of the lens) which accounts in major part for image smear.

Many image-stabilizing devices are relatively complex, employing electronic circuits, gyroscopes, complex optical systems, etc. to steady the position of the image-forming element. See, for example, the disclosures of U.S. Pat. No. 3,953,106 issued to Furukawa; U.S. Pat. No. 3,892,467 issued to Shin; and U.S. Pat. No. 3,845,929 issued to Reekie et al. Other less sophisticated devices, such as disclosed in U.S. Pat. No. 3,728,948 issued to Fraser, tend to produce an undesired distortion or defocusing of the stabilized image. The Fraser device, like many image-stabilizing devices, comprises a lens mount by which the lens is mounted for gimbal movement about a point where the optical axis of the lens intersects its focal plane. While this mounting arrangement angularly decouples the instrument housing from the image-forming lens, it allows the focal plane of the lens to tilt relative to the image plane of the instrument (i.e. the plane at which images are desirably formed, such as the film plane when the optical instrument is a camera, or the focal plane of the eyepiece when the optical instrument is a telescope or the like). This tilting acts to produce a defocused image at the instrument's image plane which worsens with displacement from the center of the image plane.

In addition to the complex mechanisms and/or the defocusing problems which characterize conventional image-stabilizing devices, most such devices comprise relatively massive components and/or low-force springs to reduce the resonant frequency of the lens mount so that it resists an instantaneous return of the lens from an unbalanced condition to a balanced condition. See, for example, the disclosures of the aforementioned U.S. Pat. Nos. 3,728,948 and 3,892,467. These massive components and springs add considerably to the weight, size and mechanical complexity of the device, making it difficult to incorporate in relatively small and/or inexpensive optical instruments.

SUMMARY OF THE INVENTION

An object of the invention is to provide a mechanically simple, light-weight image-stabilizing apparatus which, while stabilizing an image, maintains such image in relatively sharp focus. Apparatus for achieving this objective comprises the combination of (a) means for angularly decoupling an image-forming element of an optical instrument from the instrument housing, whereby the image-forming element can remain substantially centered with respect to an original line of sight, notwithstanding certain random angular changes in pitch and yaw of the instrument housing, and (b) means for maintaining the focal plane of the image-forming element substantially parallel to the image plane of the optical instrument while the instrument housing undergoes such angular changes. According to the preferred embodiment, such angularly decoupling means takes the form of at least three spaced and parallel struts, which collectively support the image-forming element, and mounting means for movably mounting each strut to the instrument housing for gimbal movement. To maintain the focal plane of the image-forming element coplanar with the instrument's image plane, each strut is similarly gimballed to a member which supports the image-forming element. As arranged, the principal plane of the image-forming element, the image plane of the optical instrument, and the struts define a parallelogram in each of two mutually perpendicular planes. As each of the struts undergo a similar gimbal movement, the parallelism between the principal plane of the image-forming element and the instrument's image plane is maintained. When the apparatus of the invention is used in a camera, the film cartridge and the film contained thereby are preferably used to counterbalance the weight of the taking lens and its support. In this manner, the need for an auxiliary counterweight is obviated.

The invention will be better understood from the ensuing detailed description of preferred embodiments, reference being made to the accompanying drawings.

BRIEF DESCRIPTION OF THE DRAWINGS

FIG. 5 is a front elevation of a portion of the camera shown in FIG. 4;

FIG. 6 shows the direction of forces exerted on a plurality of rods which comprises a preferred embodiment of the invention;

FIGS. 8 and 9 are sectional views of a camera embodying the invention showing the manner of movement of the camera lens relative to the camera housing and film plane.

DETAILED DESCRIPTION OF THE PREFERRED EMBODIMENTS

Figure 1:
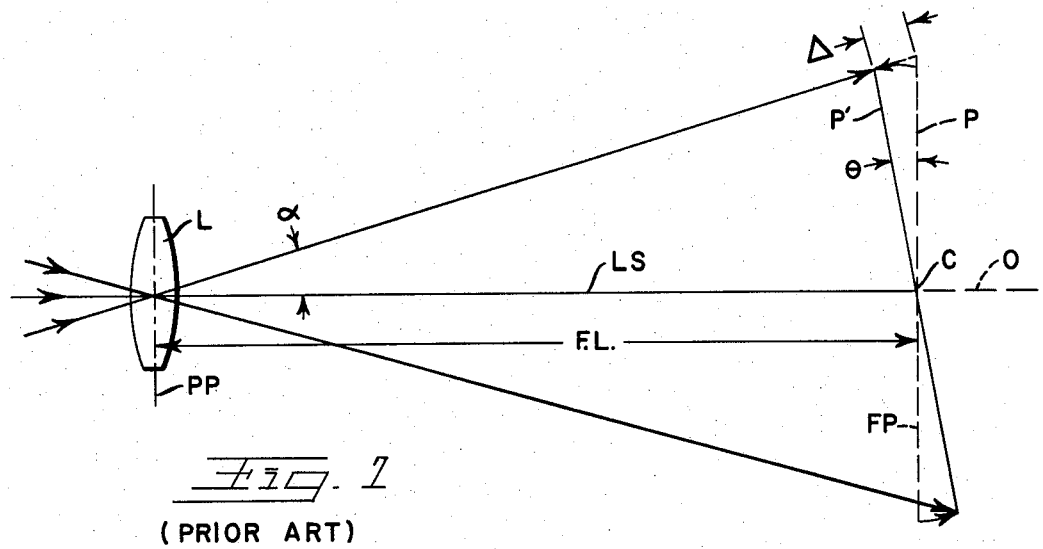
FIG. 1 is an optical diagram illustrating a prior art technique for stabilizing an image at an image plane.

Referring now to the drawings, there is shown in FIG. 1 a conventional system for stabilizing an image formed by a lens L (having a focal length F.L.) at a nominal plane P (shown in phantom lines) of an optical instrument (not shown). When the optical instrument is a camera, image plane P corresponds to the film plane; in other optical instruments (e.g. binoculars, telescopes, etc.) image plane P corresponds to the plane at which an image is projected for viewing (e.g. the focal plane of the eye-piece). Since the image plane P occupies a fixed position relative to the housing of the optical instrument, any angular change in the position of the instrument housing relative to an original line of sight L.S. will cause a corresponding change in the position of the image on the image plane. Before being subjected to any such change in position, the focal plane F.P. of lens L is coincident with the image plane of the instrument, and the optical axis O of the lens intersects the center C of the instrument's image plane.

As indicated above, it is common in conventional image stabilizing devices to angularly decouple the lens from movement of the instrument housing by mounting the lens for gimbal movement (i.e. simultaneous pivotal movement in each of two mutually perpendicular planes) about the center C of the image plane P. Mounted in this manner, lens L will remain stationary as the instrument housing pitches or yaws so that its image plane tips about its center C through an angle $\theta$ to assume a new position P'. Since, prior to such tipping, the lens produces a focused image at the instrument's initial image plane P, it can be appreciated that a partically defocused image will result at the new image plane P'. While the image formed at the center of the new image plane P' will remain in focus, the image at the boundaries of this plane will be out of focus in one direction or another, depending on whether the image plane of the instrument moves closer to or further away from the lens during its pivotal movement about point C. The amount $\Delta$ by which the projected image is defocused at the corner of the field of view is given by the expression $\Delta = D \sin \theta / \cos \alpha$, where $\theta$ = the tip angle, $\alpha$ = the half-angle of the field of view, and D = one-half the diagonal dimension of the image plane. Angle $\alpha$ is defined by $\tan^{-1} (D \cos \theta / F.L. - D \sin \theta)$.

Figure 2:
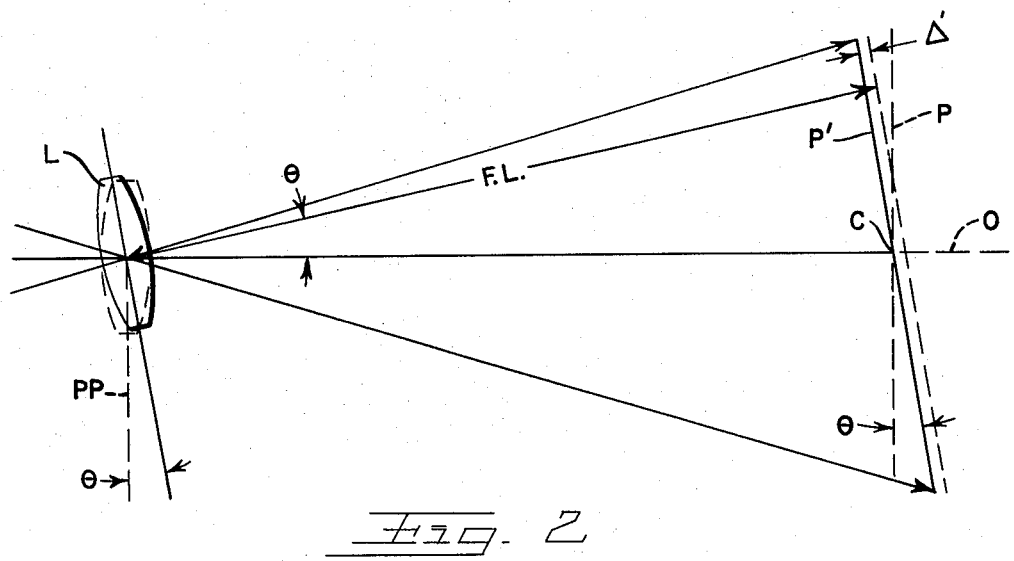
FIG. 2 is an optical diagram illustrating the manner of movement of an image-forming element relative to the image plane of an optical instrument in accordance with the image-stabilizing principles of the invention.

In FIG. 2, the image stabilizing principles of the invention are shown diagramatically. As image plane P is tipped about its center C through an angle $\theta$ to occupy a new position P', the principal plane PP of lens L pivots through an identical angle, thereby maintaining the parallelism between the focal plane F.P. of the lens and the new image plane P' of the optical instrument. It will be noted that as the angle $\theta$ increases, the physical separation between the lens and the instrument's image plane becomes shorter. The result is that the focal plane of the lens, while being maintained parallel to the image plane of the instrument, gradually becomes displaced by a distance $\Delta'$ from its initial coincidence position, thereby producing a defocusing effect. It can be shown that the displacement distance $\Delta'$ is defined by the expression $F.L. (1-\cos \theta)$, where F.L. is the focal length of lens L and $\theta$ is the tip angle. As is apparent from FIG. 2, $\Delta'$ is constant over the entire image plane of the instrument and, except for a small area at the center of the image plane, $\Delta'$ is less than the corresponding image plane/focal plane displacement which characterizes the prior art image-stabilizing apparatus.

Figure 3:
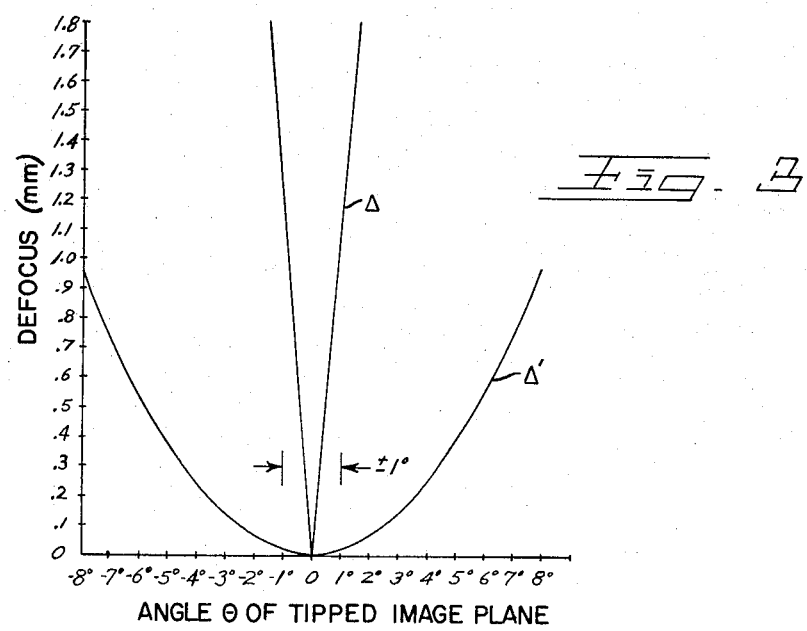
FIG. 3 is a graph comparing the focusing qualities of the apparatus of the invention with that of the prior art.

Below is a table which compares, for a 100 mm lens, the amounts of defocus, $\Delta$ and $\Delta'$, associated with the optical systems shown in FIGS. 1 and 2, respectively. The focal length of lens L was assumed to be 100 mm; the dimension D was assumed to be 57 mm. The data tabulated below is shown graphically in FIG. 3.

| Tip Angle ($\Theta$) | $\Delta$ (mm) | $\Delta'$ (mm) |
| --- | --- | --- |
| 0° | 0.0 | 0.0 |
| 1° | 1.15 | 0.015 |
| 2° | 2.30 | 0.061 |
| 3° | 3.46 | 0.137 |
| 4° | 4.62 | 0.244 |
| 5° | 5.79 | 0.381 |
| 6° | 6.96 | 0.548 |
| 7° | 8.13 | 0.745 |
| 8° | 9.31 | 0.973 |

From the graphs, it can be readily appreciated that the amount ($\Delta$) of defocusing associated with the prior art image-stabilizing apparatus discussed above is substantially greater than the amount ($\Delta'$) associated with the apparatus of the invention. As a practical matter, it can be shown experimentally that image smear associated with hand tremor can be effectively eliminated by providing an image stabilizing apparatus which allows only a $\pm 1°$ of tip angle ($\theta$). Within such an angular range the amount of defocus associated with prior art systems is approximately 100 times that associated with the present invention.

Figure 4:
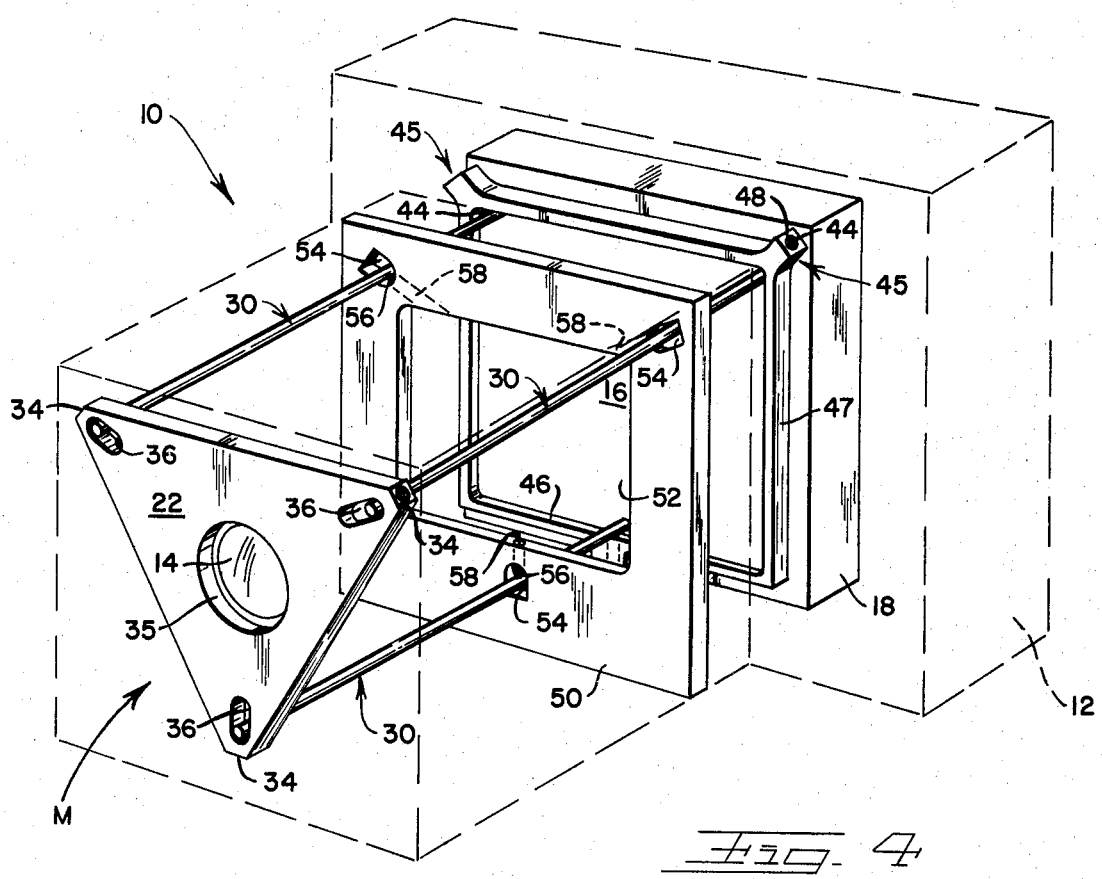
FIG. 4 is a perspective view of a camera embodying a preferred embodiment of the image-stabilizing apparatus of the invention.

In FIG. 4, a preferred embodiment of the invention is shown embodied in a photographic camera 10 of the kind which exposes and processes picture units of the self-developing type. The camera includes a housing 12 (shown schematically in phantom lines), an objective lens 14 for forming images at a film plane 16, and a cartridge 18 for containing and supporting a plurality of picture units 19 (shown in FIGS. 8 and 9) so that the outermost picture unit is located at the film plane for exposure. Since the various components of photographic cameras are well known, only those components which cooperate with the apparatus of the invention are mentioned herein.

The apparatus of the invention comprises a unique lens mount M for angularly decoupling lens 14 from housing 12 so that certain, relatively high frequency (e.g. 10 Hz, the most prevalent frequency of hand tremor) and slight angular movements (e.g. $\pm 2°$) of the housing relative to the optical axis of lens 14 are not transmitted to the lens. This lens mount, unlike conventional image-stabilizing mounts, preserves the parallelism between the lens and the film plane while allowing the center of the lens to remain substantially stationary with respect to an original line of sight during movement of the camera housing.

Figure 7:
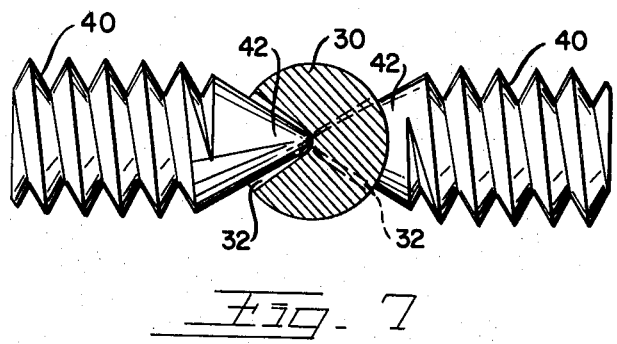
FIG. 7 is a cross-sectional view of a rod shown in FIG. 6 showing the manner in which it is pivotally supported.

Lens mount M comprises a lens support plate 22 and three parallel struts 30 which extend between plate 22 and film cartridge 18. As best shown in FIGS. 6 and 7, each strut 30 preferably comprises a light-weight, solid rod or thin-walled, light-weight metal tube 31 having three cone-shaped detents 32 formed in the surface thereof. Two of these detents are located near the ends of the struts, both extending radially inward from the same direction to approximately the longitudinal axis of the strut. The third detent is located intermediate the ends, in the plane of the center of gravity G of the lens mount/film cartridge combination. Like other detents, the intermediate detent extends radially inward to the longitudinal axis of the strut, but it is preferably located diametrically opposed to the other detents and thus extends inwardly from the opposite direction.

Lens support plate 22 is preferably triangular in shape, each corner 34 being flattened. A circular aperture 35 is provided at a central location to receive and support objective lens 14. Near each of the three corners of plate 22, slightly elongated apertures 36 are formed for receiving struts 30. Each aperture 36 has a width slightly larger than the outside diameter of struts 30. A threaded bore 38, shown in phantom lines in FIG. 5, connects each of the flattened edges 34 with each of the three apertures 36, the longitudinal axis of each bore extending radially with respect to the geometric center C' of plate 22. Note, the geometric center C' need not coincide with the optical axis O of lens 14. (See FIG. 5.) In fact, it will be to the camera designer's advantage to position the rods wherever possible so as to clear the optical path and to keep the front of the camera as small as possible. A set screw 40 (or the like) having a cone-shaped tip 42 is threaded into each of the bores, tip 42 extending into aperture 36 to engage a detent formed in one end of the struts 30. The difference in cone angles between set screw tip 42 and detent 32 is preferably at least 4°, thereby giving each strut the capability of gimballing about the screw tip, through an angular range of approximately ±2°.

In a manner somewhat similar to that described above, each strut 30 is gimballed to film cartridge 18. Three set screws 44 having cone-shaped tips (not shown) are positioned in three threaded bores 48 (shown in phantom) formed in the upper corners 45 and base 46 of a rectangular frame 47 attached to the front surface of film cartridge 18. These set screws engage the detents formed near the respective ends of struts 30, i.e., the ends opposite those ends which engage plate 22. Again, the cone angles of the cone-shaped tips of screws 44 are smaller than that of the detents which they engage, thereby giving the struts the capability of gimballing through an angular range of about ±2°. By adjusting the position of each set screw, struts 30 are made to be substantially parallel to each other. Thus, it can be seen from FIG. 4 that the lens support plate 22, together with struts 30 and film cartridge 18, define a flexible structure which, when viewed from either the top or side, appears as a parallelogram with the struts being the sides thereof, and the lens support plate and the film cartridge being the top and bottom. Owing to the gimbal mounting, the plane of the lens and the film plane are maintained parallel while the struts experience similar angular movements in their respective gimbal movements. Preferably, the spacing, measured along the linkage struts 30, between the gimbal points of plate 22 and the gimbal points of the film cartridge, is substantially equal to the focal length of lens 14. Otherwise, the lens mount will either over- or under-compensate for image smear.

The struts of the structure described above are supported by the camera housing for gimbal movement, by means of a rectangular plate 50 having a central aperture 52 formed therein through which image light passes to the film plane. Plate 50 is rigidly coupled to the camera housing and has three apertures 54 formed therein through which struts 30 pass. Set screws 56 extending into apertures 54 from three radially extending bores 58 (shown in phantom lines) engage the intermediate cone-shaped detent formed in each of the rods. Like the other set screws, each of the set screws 56 has a cone-shaped tip having a cone angle at least 4° smaller than the cone angle of the intermediate detents. By means of this support, the struts 30 can gimbal about the top of each set screw through an angular range of ±2°. During this gimbal movement, the principal plane of lens 14 is always maintained parallel to the film plane 16. Plate 50 is positioned so that the plane thereof is perpendicular to the nominal position of the optical axis O of lens 14, and so that it contains the center of gravity G of the parallelogram structure.

When properly positioned within the camera housing, the lens mount/film cartridge structure is in a balanced condition with the weight of the film cartridge counter-balancing the weight of plate 22 and lens 14. When balanced, the inward forces (shown as arrows in FIG. 6) exerted on the ends of struts 30 by the set screws associated with lens plate 22 and film cartridge 18 are reacted by the outward forces exerted by set screws 56 of camera plate 50. This arrangement of forces prevents the struts from twisting out of mutual parallelism.

To maintain the above-mentioned balanced condition after the individual picture units 19 have been exposed and ejected from the camera housing, a sliding weight (not shown) can be mechanically coupled to the film cartridge. As more picture units are removed, the sliding weight slides further away from the pivot points provided by set screws 56. As indicated above, each of the set screws which engage detents 32 is located so that the struts are parallel to one another.

In FIGS. 8 and 9, a camera similar to that shown in FIG. 4 is shown in cross-section. Similar parts have been given the same reference characters. FIG. 8 shows the position of the lens mount at the initiation of the exposure interval, and FIG. 9 shows the position of the mount after the camera housing has pitched (or yawed) in such a manner that the film plane 16 is tipped through an angle $\theta$. As shown in FIG. 9, when housing 12 is tilted, the principal plane PP of lens 14 remains substantially parallel to the film plane 16, and the center of the lens remains stationary with respect to the original line of sight LS. By maintaining parallelism between the lens plane and the film plane, the image formed at the film plane remains in relatively sharp focus during the angular movement of the camera housing. There is, however, a slight amount ($\Delta'$) of defocusing because the film plane-to-lens distance, measured normal to the film plane, is reduced. It should be borne in mind that the angular change $\theta$ shown in the drawing is greatly exaggerated, as is the distance $\Delta'$. Test results indicate that more than 95 percent of all pictures taken at exposure times of $\frac{1}{8}$ second or less can have image smear, due to camera shake, completely eliminated by a lens mount which allows as little as ±1° of angular movement of the optical axis O of the lens relative to the original line of sight LS. Such an angular movement produces an undiscernible amount of defocusing which is attributable, in major part, to the fact that the lens plane remains parallel to the film plane. In fact, an f/1.2 lens can accommodate a 3.7° angular change ($\theta$) before $\Delta'$ exceeds the depth of focus of the lens. Lenses of higher f/numbers, of course, can accommodate even larger angular changes.

Figure 10:
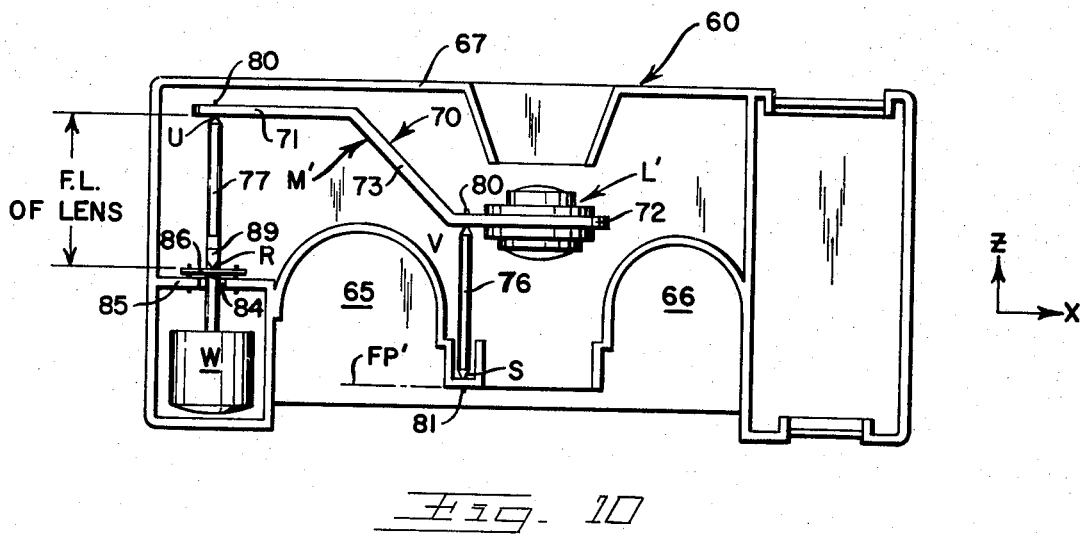
FIGS. 10 and 11 are top and partial perspective views, respectively, of a camera embodying another preferred embodiment of the invention.
Figure 11:
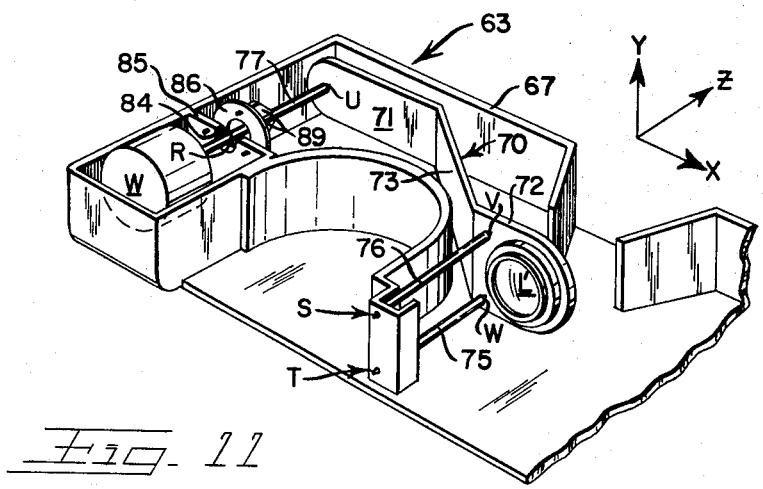

Referring now to FIGS. 10 and 11, another preferred embodiment of the invention is shown incorporated in a so-called "pocket" camera 60 of the type which accepts a size 110 film cartridge (not shown) in chambers 65 and 66, defined by the camera housing 67. When a film cartridge is loaded into the camera, the film is positioned for exposure at film plane FP'. The lens mount M' of this camera differs in part from the lens mount discussed above in that a small auxiliary weight W is used to counterbalance the weight of the lens mount M' and the taking lens L'.

Lens mount M' comprises an angular brace 70 which includes a pair of parallel planar members 71 and 72 which extend in opposite directions from a medial section 73. Planar member 71 supports the camera's taking lens L'. Brace 70 is supported by three parallel struts 75, 76 and 77, each of which is gimballed to both the camera housing (at pivot points R, S and T) and to brace 70 (at pivot points U, V and W). By this mounting arrangement, lens L' remains parallel to the film plane while the struts gimbal in the XZ and YZ planes. The spacings RU, SV and TW between the pivot points on each strut are substantially equal, each being substantially equal to the focal length of the taking lens L'. One end of each of struts 75, 76 and 77 terminates in a thin flexible pin 80 which is secured by a small hole formed in the planar members of brace 70. Similar pins 81 are also formed at the opposite ends of rods 75 and 76. Pins 81 are engaged by small bores formed in the camera housing in the vicinity of the film plane. Strut 77 passes through an aperture 84 formed in a plate 85 supported by the camera housing. The free end of strut 77 (i.e. the end opposite pin 80) supports the auxiliary weight W. A thin, flexible washer 86 supports strut 77 at intermediate point R, allowing the strut to pivot in the aforementioned mutually perpendicular planes. Washer 86 is connected to support plate 85 by a pair of small pins 87 at either side of strut 77. A pair of lugs 89 extending from opposite sides of strut 77 are connected to the upper surface of the flexible washer. Washer 86 exerts a restoring force to return the lens mount to an equilibrium position after the lens mount and camera housing have moved relative to each other from a normal position. Since the resonant frequency of this mechanism is dependent, in part, on the stiffness of this flexible supporting washer, its thickness is chosen to create a resonant frequency to be effective at the typical hand tremor frequency of approximately 10 Hz.

From the foregoing, it may be appreciated that the gimballed struts 75, 76 and 77 act to angularly decouple lens L' from housing 67. Further, as the camera housing pitches and yaws due to hand tremor, the principal plane of lens L' is maintained parallel to the film plane and centered on an original line of sight.

The invention has been described in detail with particular reference to a preferred embodiment thereof, but it will be understood that variations and modifications can be effected within the spirit and scope of the invention.

I claim:

1. In an optical instrument comprising a housing, a lens for forming an image of an object spaced from the housing at an image plane of such instrument, means for supporting the lens, and image stabilizing means for reducing image smear of an image formed at the image plane as a result of random angular motion of the housing relative to an original line of sight between an object and image thereof, the improvement wherein said image-stabilizing means comprises:

means for mounting the lens for movement relative to the housing, said mounting means comprising at least three spaced struts, means for mounting each of said struts to the lens support means for gimbal movement, about a first point, and means for mounting each of the struts to the housing for gimbal movement about a second point, whereby said mounting means maintains the principal plane of the lens substantially parallel to the image plane during movement of the lens with respect to the housing.

2. The apparatus as defined in claim 1 wherein said first and second points are spaced apart a distance substantially equal to the focal length of the lens.

3. The apparatus as defined in claim 1 wherein said struts are mutually parallel and said first and second pivot points lie respectively in first and second spaced parallel planes, whereby said planes and said struts define, in each of two mutually perpendicular planes, a parallelogram.

4. The apparatus as defined in claim 1 further comprising means operatively connected to at least one of said struts for counterbalancing the weight of said lens and lens support about said second point.

5. The apparatus as defined in claim 4 wherein said counterbalancing means comprises photosensitive film element and a support therefor.

6. In a camera of the type which includes a housing, a lens for focusing scene light at a film plane, and means for supporting such lens, the improvement comprising:

mounting means for mounting said support means for movement relative to said housing, said mounting means comprising a plurality of spaced struts, first mounting means for movably mounting each of said struts to said support means for gimbal movement about a first point; and second mounting means for movably mounting each of said struts to the camera housing for gimbal movement about a second point spaced from said first point, whereby said mounting means maintains the principal plane of the lens substantially parallel to the film plane during movement of the support means relative to said housing, random angular motion of the housing in first and second planes which are perpendicular to each other and to said film plane thereby being substantially decoupled from the lens.

7. The apparatus as defined in claim 6 wherein said first and second points are spaced apart a distance substantially equal to the focal length of said lens.

8. The apparatus as defined in claim 6 wherein said struts are mutually parallel, and said first and second points lie respectively in first and second spaced planes.

9. The apparatus as defined in claim 8 wherein said first and second planes are mutually parallel, whereby said planes and said struts define, in two mutually perpendicular planes, a parallelogram.

10. The apparatus as defined in claim 6 further comprising a weight, means mounting said weight to at least one of said struts, and means for gimballing said one rod to the camera housing so that said weight counter-balances the lens and the lens holder.

11. The apparatus as defined in claim 8 wherein said weight comprises a film cartridge.

* * * * *